Aug. 4, 1931.  A. BRANDT  1,817,173
DECORATIVE WREATH
Filed Aug. 6, 1930
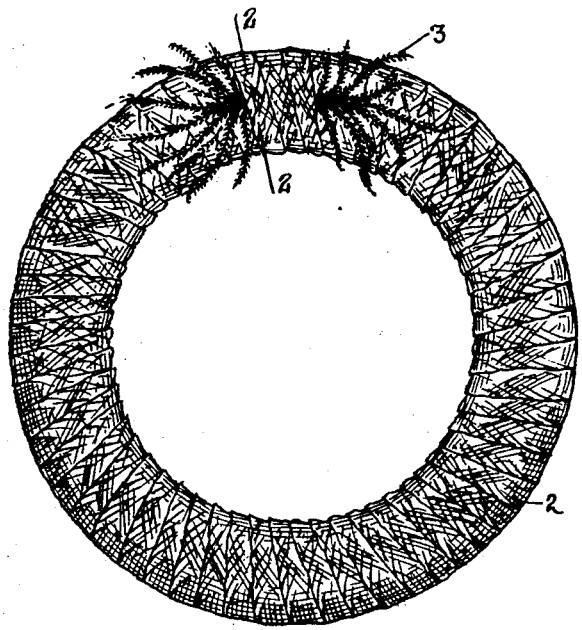
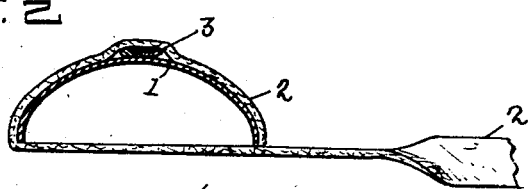
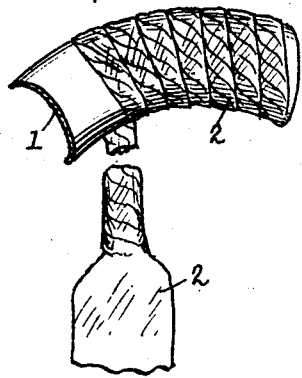 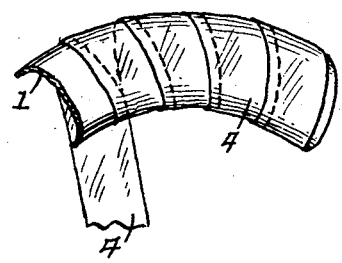 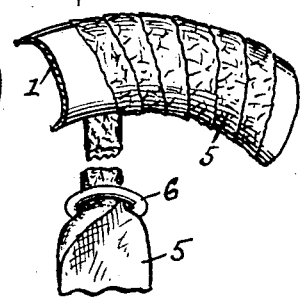
Abram Brandt
INVENTOR
BY
ATTORNEY Patented Aug. 4, 1931

1,817,173

UNITED STATES PATENT OFFICE

ABRAM BRANDT, OF NEW YORK, N. Y., ASSIGNOR TO JAS. BRANDT & BRO., OF NEW YORK, N. Y., A COPARTNERSHIP COMPOSED OF LOUIS BRANDT AND ABRAM BRANDT

DECORATIVE WREATH

Application filed August 6, 1930. Serial No. 473,462.

My invention relates to decorative wreaths and it is my object to produce a wreath which will be ornamental, light, cheap to produce and permanently retain its original appearance.

In the drawings Fig. 1 is a face view of my improved wreath; Fig. 2 a sectional view of the structure of Fig. 1 on the line 2—2 thereof; Fig. 3 a fragmentary view of a wreath showing the covering in twisted, crinkled form; Fig. 4 a fragmentary view of a wreath showing the covering in flat form; and Fig. 5 a fragmentary view showing the covering in crinkled form.

The wreath comprises a base ring 1 of any desired size or shape, and is preferably made of paper board with a concavo-convex cross-section as shown in Figs. 2, 3, 4 and 5.

The covering 2 is preferably made of a pyroxylin material, such as cellophane, in ribbon form, and may be of any desired color, opaque or transparent. As shown in Figs. 1, 2 and 3 this ribbon is twisted into a crinkled, rope-like form and then wrapped around the base ring 1 with its edges overlapping, as shown in Figs. 1, 2 and 3. An ornamental spray 3, or the like, may be secured to the wreath by laying it on the partly wrapped wreath and then wrapping the ribbon over a part thereof as shown in Figs. 1 and 2.

The ribbon 4 may be wrapped flat around the base ring as shown in Fig. 4, with its edges overlapping, or, instead of being crinkled by twisting, as shown in Figs. 1, 2 and 3 it may be crinkled by pulling it through a small ring 6 as shown in Fig. 5, the ribbon 5 being shown passing through the ring on its way to the base ring 1.

This results in a wreath which permanently presents a sightly appearance and which is light and quickly and cheaply produced so that it may be sold very cheaply.

I claim:—

A decorative wreath composed of a base ring of concavo-convex cross-section, a covering comprising a crinkled ribbon of ornamental material wrapped thereon with its edges overlapping whereby the base ring is concealed and an ornament held to said wreath by wrapping a portion of the covering ribbon over a portion of the ornament.

In testimony whereof I have affixed my signature.

ABRAM BRANDT.